US009123206B2

(12) United States Patent
Mak

(10) Patent No.: US 9,123,206 B2
(45) Date of Patent: Sep. 1, 2015

(54) GAME LIBRARY MANAGER FOR A GAMING MACHINE

(75) Inventor: Ryan S. Mak, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 1355 days.

(21) Appl. No.: 11/570,575

(22) PCT Filed: Jun. 30, 2005

(86) PCT No.: PCT/US2005/023480

§ 371 (c)(1), (2), (4) Date: Dec. 18, 2008

(87) PCT Pub. No.: WO2006/004997

PCT Pub. Date: Jan. 12, 2006

(65) Prior Publication Data

US 2009/0156282 A1 Jun. 18, 2009

Related U.S. Application Data

(60) Provisional application No. 60/584,267, filed on Jun. 30, 2004.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.

CPC .................................. *G07F 17/3262* (2013.01)

(58) Field of Classification Search

CPC ....................................................... H04L 41/08

USPC .................. 463/42, 43, 29; 719/332; 709/220

See application file for complete search history.

(56) References Cited

U.S. PATENT DOCUMENTS

| | | | |
|---|---|---|---|
| 5,759,103 A | 6/1998 | Freels et al. | |
| 6,006,034 A * | 12/1999 | Heath et al. | 717/170 |
| 6,364,765 B1 | 4/2002 | Walker et al. | |
| 7,519,690 B1 * | 4/2009 | Barrow et al. | 709/220 |
| 7,931,533 B2 * | 4/2011 | LeMay et al. | 463/29 |
| 2003/0074487 A1 | 4/2003 | Akgul et al. | |
| 2003/0216182 A1 | 11/2003 | Gauselmann | |
| 2003/0224858 A1 | 12/2003 | Yoseloff et al. | |
| 2004/0048671 A1 * | 3/2004 | Rowe | 463/42 |
| 2004/0180721 A1 * | 9/2004 | Rowe | 463/42 |
| 2004/0254006 A1 * | 12/2004 | Lam et al. | 463/16 |
| 2004/0254013 A1 * | 12/2004 | Quraishi et al. | 463/29 |
| 2008/0045346 A1 * | 2/2008 | Nelson et al. | 463/42 |

OTHER PUBLICATIONS

"International Search Report for Application No. PCT/US2005/023480, date mailed Dec. 23, 2005", 2pgs.

"Written Opinion of the International Searching Authority for Application No. PCT/US2005/023480 mailed Dec. 23, 2005", 4 pgs.

* cited by examiner

*Primary Examiner* — Kang Hu

*Assistant Examiner* — Syvila Weatherford

(74) *Attorney, Agent, or Firm* — Nixon Peabody LLP

(57) ABSTRACT

Systems and methods for managing a gaming machine having one or more games and game configurations are disclosed. One aspect of the systems and methods includes providing a game framework including a game library manager that manages creation, update and deletion of multiple wagering games on a gaming machine.

16 Claims, 7 Drawing Sheets

GAME LIBRARY MANAGER FOR A GAMING MACHINE

RELATED APPLICATION APPLICATIONS

This application is a U.S. National Stage Filing under 35 U.S.C. 371 from International Patent Application Serial No. PCT/US2005/023480, filed Jun. 30, 2005, and published on Jan. 12, 2006 as WO 2006/004997 A2 and republished on Jun. 1, 2006 as WO 2006/004997 A3, which claims the benefit of U.S. Provisional Application Ser. No. 60/584,267 filed Jun. 30, 2004, which applications are incorporated herein by reference.

FIELD

The present invention relates generally to software for gaming machines, and more particularly to providing a game library manager for a gaming machine.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2003, 2004, WMS Gaming, Inc. All Rights Reserved.

BACKGROUND

Today's gaming machine typically comprises a computerized system controlling a video display or reels that provide wagering games such as slots, video card games (poker, blackjack etc.), video keno, video bingo, video pachinko and other games typical in the gaming industry. In order to prevent players from becoming bored, new versions of wagering games, and alterations to existing games are constantly being developed.

In past systems, the software controlling the computerized system has been primarily proprietary software, including both the operating system and gaming software. Additionally, in previous systems the gaming terminal software has been provided as a single monolithic system. That is, all of the software is built and provided as a single product or unit, typically on a persistent storage device such as a flash memory, a compact flash memory, EEPROM or a hard disk.

This manner of providing gaming software can lead to several problems. A first problem concerns updating games or game features on a gaming machine. In previous systems, every time a new game is released, a technician must go to the gaming machine, unlock and open the gaming machine, remove the old persistent storage media and replace the old media with new media containing the new or updated game. During this time, the gaming machine is unavailable for use, resulting in a loss of revenue for the gaming establishment.

A further problem is that different jurisdictions (e.g. nations, states, provinces etc.) have varying rules that are enforced with respect to gaming. Accommodating each jurisdiction's rules in previous systems becomes more and more complex as time goes on, as gaming software must be rebuilt and stored on a different persistent media for each different jurisdiction in which the game will be supplied.

In view of the above mentioned problems and concerns, there is a need in the art for the present invention.

SUMMARY

The above-mentioned shortcomings, disadvantages and problems are addressed by the present invention, which will be understood by reading and studying the following specification.

Systems and methods provide a game library manager and framework environment that supports loading one or more game modules and configurations. One aspect of the systems and methods includes providing a set of game framework components that can be utilized by multiple independent game library modules. A further aspect of the systems and methods include various plug-in services that use the framework to communicate and interact with one another.

The present invention describes systems, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

Figure 1:
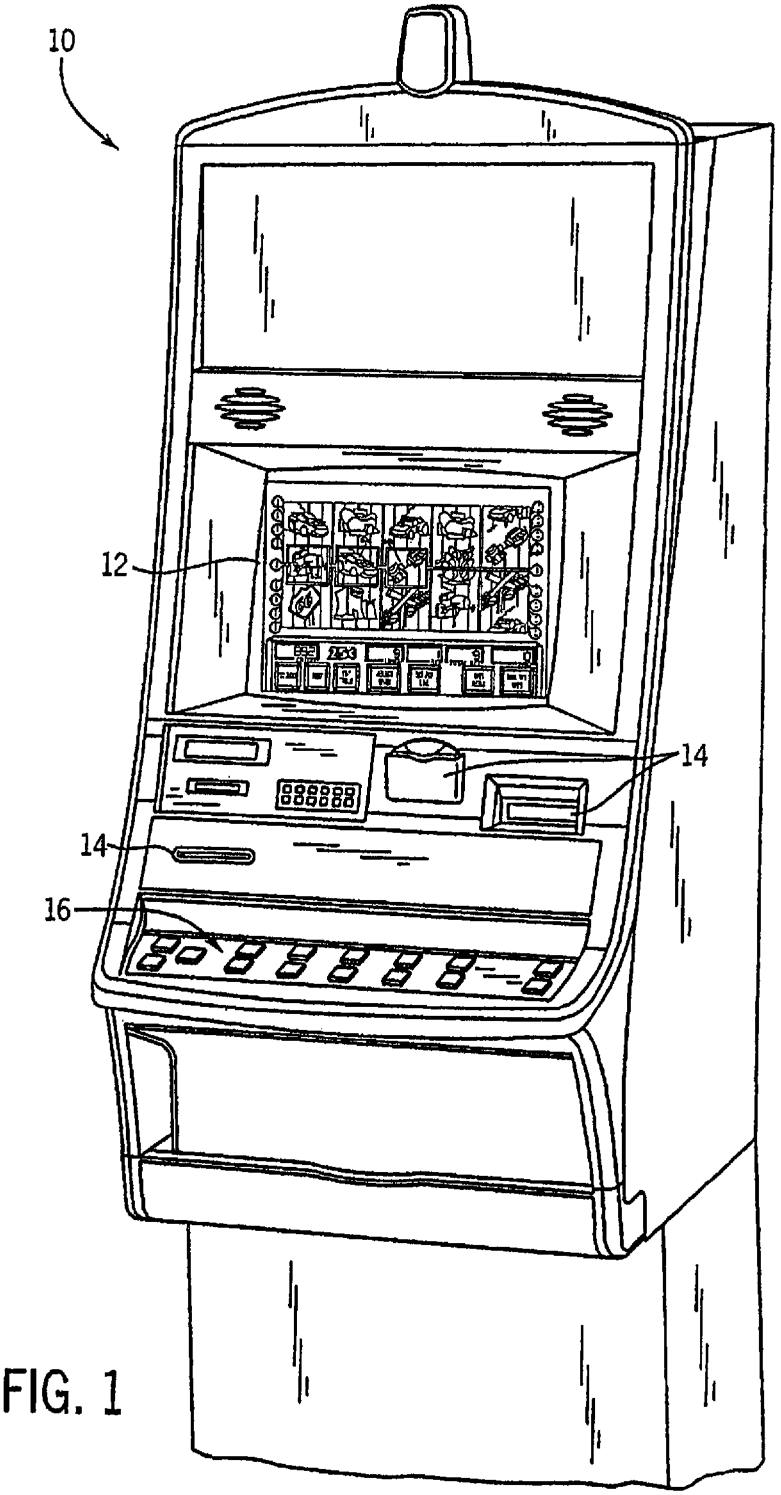
FIG. 1 is a perspective view of a gaming machine embodying the present invention.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The description of the various embodiments is to be construed as exemplary only and does not describe every possible instance of the invention. Numerous alternatives could be implemented, using combinations of current or future technologies, which would still fall within the scope of the claims. The following detailed description is, therefore, not to be taken in a limiting sense, and the scope of the present invention is defined only by the appended claims.

Operating Environment

FIG. 1 illustrates an exemplary gaming machine 10, also referred to as a Video Lottery Terminal (VLT), in which embodiments of the invention may be implemented. In some embodiments, gaming machine 10 is operable to conduct a wagering game such as mechanical or video slots, poker, keno, bingo, or blackjack. If based in video, the gaming machine 10 includes a video display 12 such as a cathode ray tube (CRT), liquid crystal display (LCD), plasma, or other type of video display known in the art. A touch screen preferably overlies the display 12. In the illustrated embodiment, the gaming machine 10 is an "upright" version in which the display 12 is oriented vertically relative to a player. Alternatively, the gaming machine may be a "slant-top" version in which the display 12 is slanted at about a thirty-degree angle toward the player.

The gaming machine 10 includes a plurality of possible credit receiving mechanisms 14 for receiving credits to be used for placing wagers in the game. The credit receiving mechanisms 14 may, for example, include a coin acceptor, a bill acceptor, a ticket reader, and a card reader. The bill acceptor and the ticket reader may be combined into a single unit. The card reader may, for example, accept magnetic cards and smart (chip) cards coded with money or designating an account containing money.

In some embodiments, the gaming machine 10 includes a user interface comprising a plurality of push-buttons 16, the above-noted touch screen, and other possible devices. The plurality of push-buttons 16 may, for example, include one or more "bet" buttons for wagering, a "play" button for commencing play, a "collect" button for cashing out, a help" button for viewing a help screen, a "pay table" button for viewing the pay table(s), and a "call attendant" button for calling an attendant. Additional game specific buttons may be provided to facilitate play of the specific game executed on the machine. The touch screen may define touch keys for implementing many of the same functions as the push-buttons. Other possible user interface devices include a keyboard and a pointing device such as a mouse or trackball.

A processor controls operation of the gaming machine 10. In response to receiving a wager and a command to initiate play, the processor randomly selects a game outcome from a plurality of possible outcomes and causes the display 12 to depict indicia representative of the selected game outcome. In the case of slots for example mechanical or simulated slot reels are rotated and stopped to place symbols on the reels in visual association with one or more pay lines. If the selected outcome is one of the winning outcomes defined by a pay table, the CPU awards the player with a number of credits associated with the winning outcome.

Figure 2:
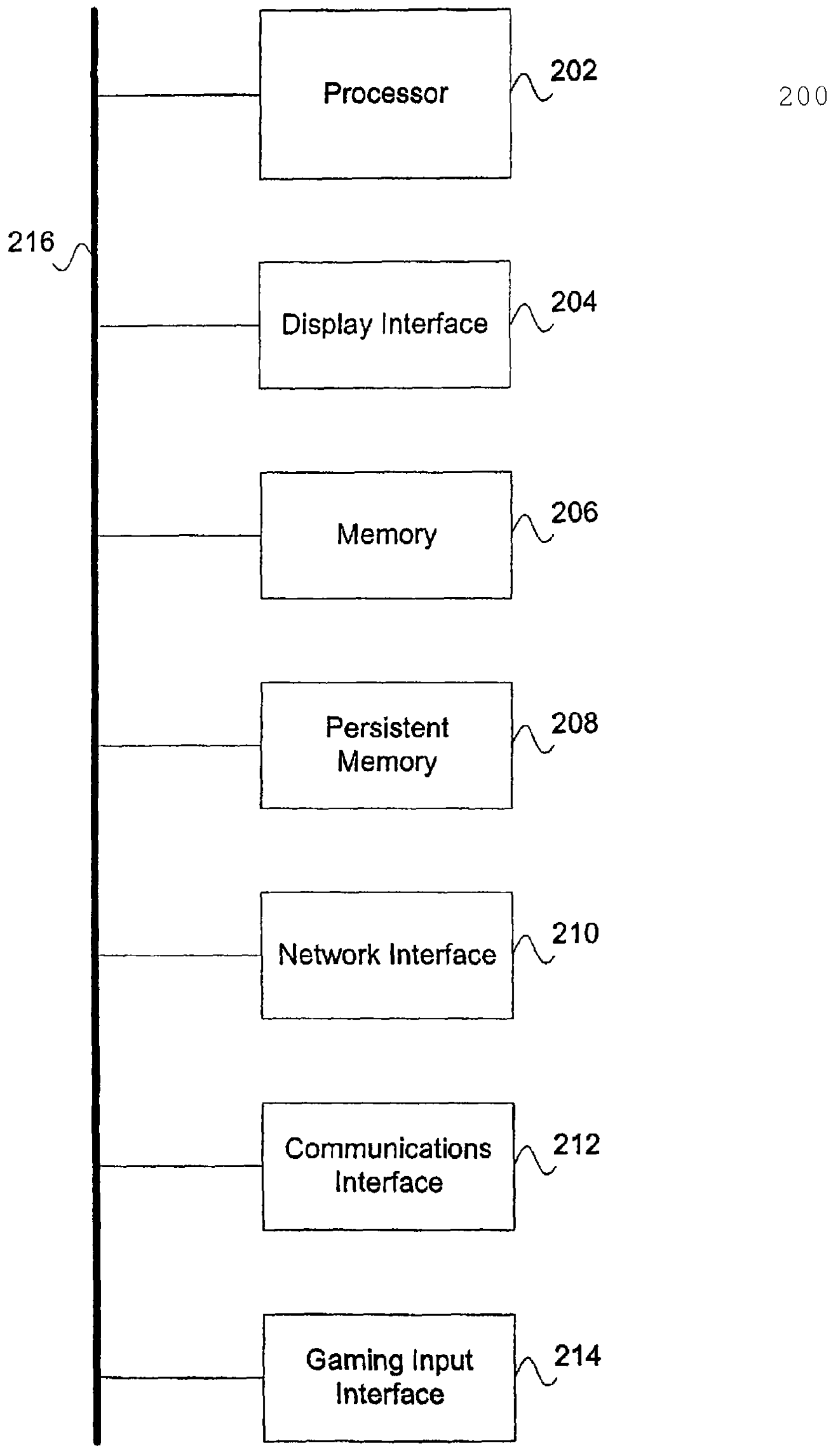
FIG. 2 is a block diagram of a gaming control system suitable for operating the gaming machine in FIG. 1.

FIG. 2 is a block diagram of a gaming control system 200 suitable for controlling the operation of the gaming machine 10 in FIG. 1. In some embodiments of the invention, gaming control system 200 includes one or more processors 202, one or more displays 204, memory 206, persistent memory 208, network interface 210, communications interface 212, gaming input interface 214 all communicably coupled via a bus 216 Processor 202 executes operating system and gaming software stored in memories 206 and 208. In some embodiments, processor 202 may be a processor from the Intel Pentium® family of processors, however the invention is not limited to any particular processor. Memory 206 may be a random-access memory capable of storing instructions and data used by an operating system and gaming application.

Persistent memory 208 is a memory that may be used to store operating system and gaming software for loading and execution by processor 202. Persistent memory 208 may be a ROM, a flash memory (including compact flash memory), an EEPROM, a hard drive, a CD-ROM, DVD-ROM or other type of memory able to persistently store software and data.

Display interface 204 operates to control one or more displays such as display 12 of gaming machine 10.

Figure 3:
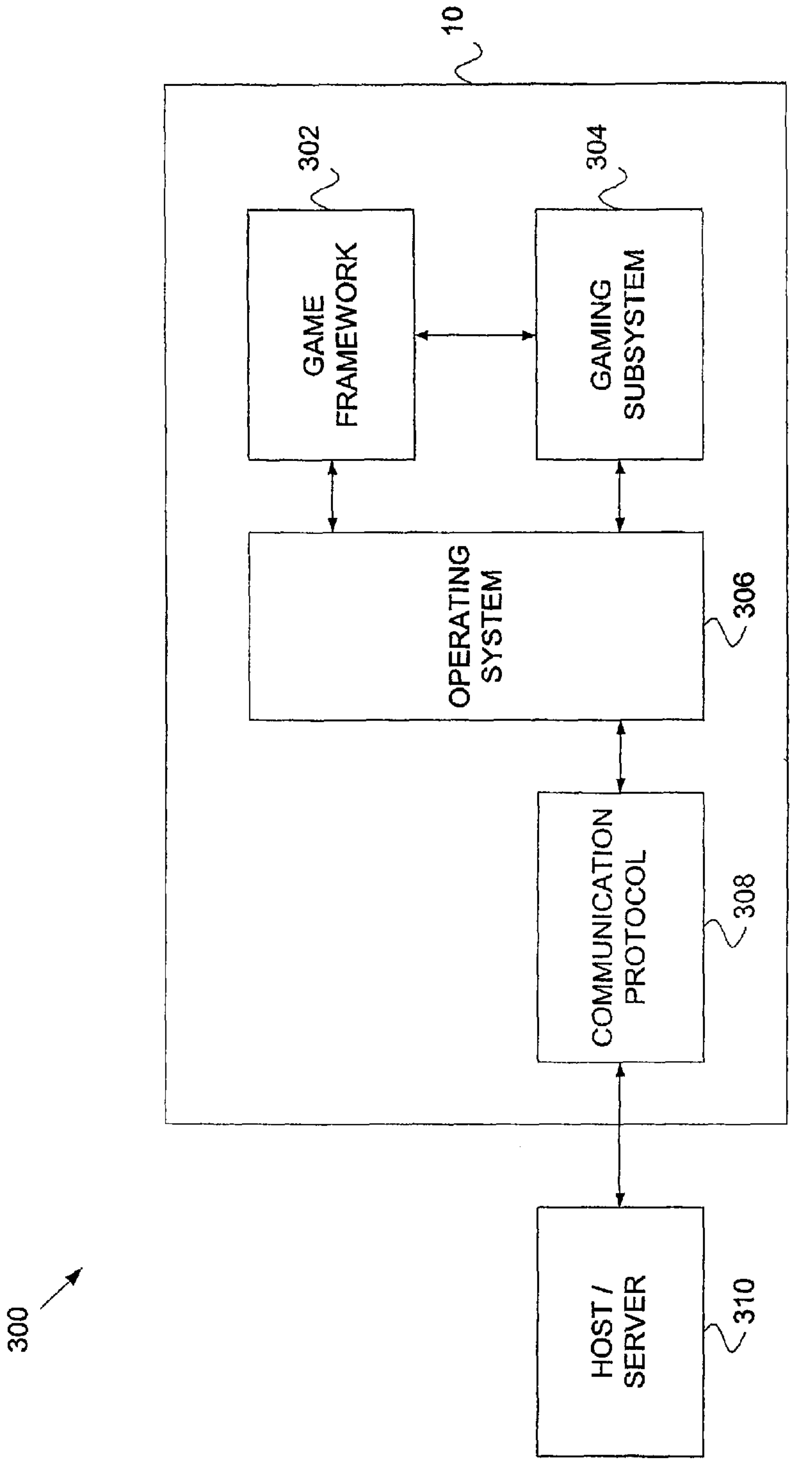
FIG. 3 is a block diagram of a software environment for a gaming machine including a game framework and gaming subsystem used in varying embodiments of the invention.

FIG. 3 is a block diagram of a software environment 300 for a gaming machine used in varying embodiments of the invention. In some embodiments, software environment 300 includes a game framework 302 and a gaming subsystem 304 running under the control of an operating system 306. In some embodiments, operating system 306 is the Linux operating system. However, operating system 306 may be any of a variety of operating systems available for gaming machines and servers supporting gaming systems. Examples of such operating systems include the Microsoft Windows family of operating systems, variants of the UNIX operating system, and other proprietary operating systems such as Integrity (e.g. with a Linux compatibility layer), VxWorks, QnX and Vertex operating systems. Those of skill in the art will appreciate that the concepts of the inventive subject matter may be incorporated in a variety of operating systems now known or developed in the future.

Game framework 302 manages game contents and jurisdictionally specific menu screen elements and serves the front end of the Video Lottery Terminal (VLT). Game contents are resources that may be statically allocated during runtime or dynamically loaded during initialization. Jurisdictionally specific elements consist of objects such as menu screens, layouts and banner elements. These elements are defined and governed by jurisdictional requirements. Further details regarding game framework 302 are provided below with reference to FIG. 4.

Gaming subsystem 304 is a centralized management entity for Video Lottery Terminal 10. In some embodiments, gaming subsystem 304 controls the loading of game content and libraries for VLT 10. Further details regarding gaming subsystem 304 are provided below with reference to FIG. 5.

Communication protocol component 308 is a protocol stack for supporting communication between a host 310 and a VLT 10. In some embodiments, communication protocol 308 is a TCP/IP protocol, and also includes support for file transfer protocols such as TFTP (Trivial File Transfer Protocol) and/or FTP (File Transfer Protocol). Those of skill in the art will appreciate that other communications protocols exist and are within the scope of the inventive subject matter.

Host 310 may be any type of computer system that may communicate with a VLT 10. For example, host 310 may be a game server that may be used to store game content and applications that may be downloaded to VLT 10 using protocols supported by communication protocol 308.

Various mechanisms exist that may be used to make the framework components available to other software components (for example, application and plug-in software). In Microsoft Windows based environments, the framework may be provided as a Dynamic Link Library (DLL). In UNIX and UNIX-like environments, the framework may be provided as a shared object library (".so" library). The inventive subject matter is not limited to any particular dynamically loaded and/or shared library format.

Figure 4:
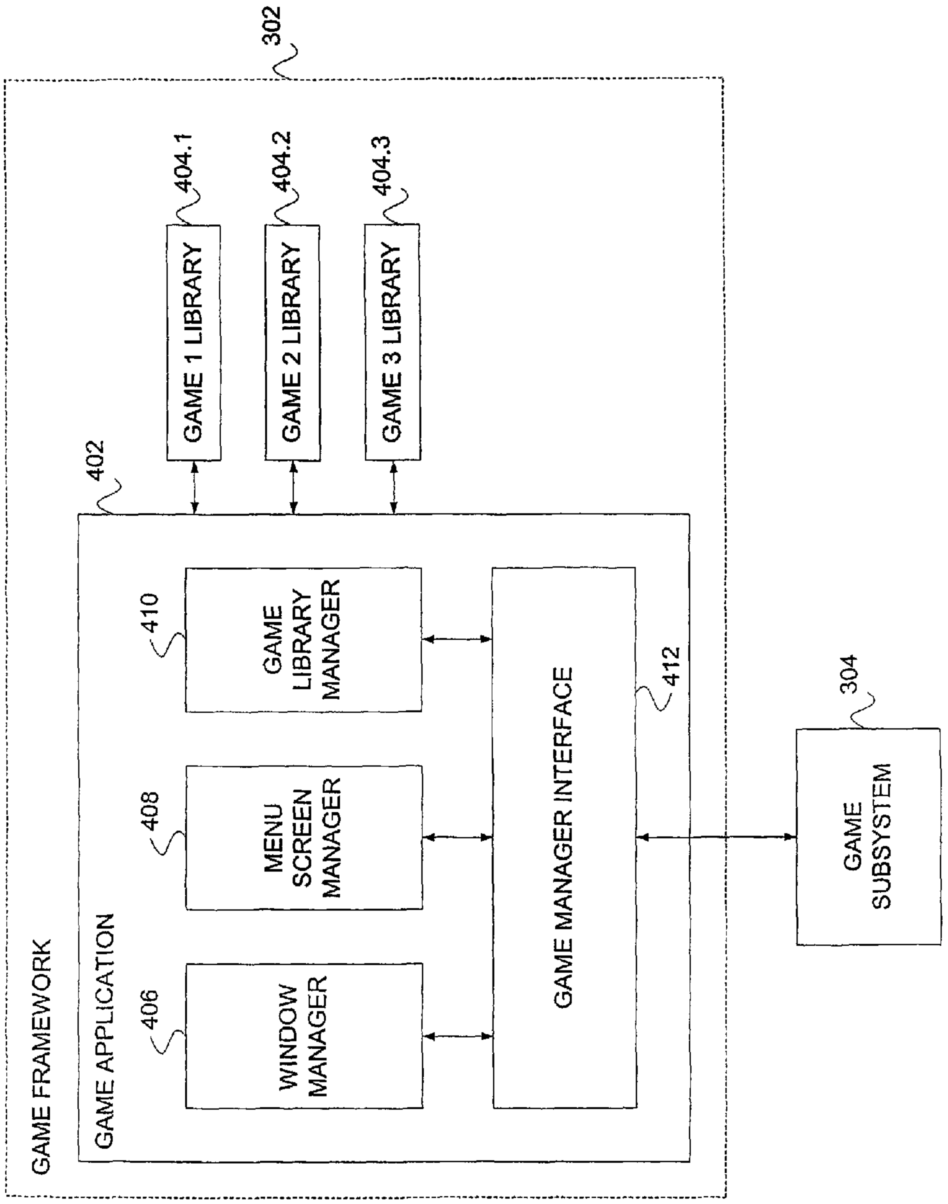
FIG. 4 is a block diagram providing further details of a game framework according to varying embodiments of the invention.

FIG. 4 is a block diagram providing further details of a game framework 302 according to varying embodiments of the invention. In some embodiments, game framework 302 includes a game application 402 that interacts with one or more game libraries 404. Game application 402 includes one or more subcomponents in varying embodiments of the invention. These subcomponents include window manager 406, menu screen manager 408, game library manager 410 and game manager interface 412.

Window manager 406 manages a main window for a game application. This module centralizes the functions needed to coordinate the control of the display between the game libraries 404 and the menu screen. For example, window manager 406 controls and coordinates the display of menus, icons, and other input/output mechanisms involved with user interaction with a game. In some embodiments, window manager 406 is an Xlib based window manager. However, other window management mechanisms may be used and are within the scope of the inventive subject matter.

Menu screen manager 408 is responsible for creating a menu screen that is compliant with jurisdictional requirements. In other words, the menu screen manager uses the configuration to define what the main selection window looks like for a particular jurisdiction. The menu screen may provide for the selection of a particular game from one or more games available according to the jurisdictional configuration. In addition, menu screen manager 408 may manage the transition from menu display to game application display. The menu screen is displayed through a window controlled by window manager 406. The characteristics and layout of the menu screen are loaded during runtime from a configuration file. An exemplary configuration file is provided below. In some embodiments, the configuration file is an XML file. In particular embodiments, the Xerces XML parser is used for parsing the configuration file. Those of skill in the art will appreciate that other XML parsers exist and are within the scope of the inventive subject matter.

Game library manager 410 manages the game libraries 404 within game framework 302. In general, game library manager 410 is responsible for the dynamic loading, instantiation, and deletion of game library objects 404. In addition, game library manager 410 may control resources available to games in game library 404. Examples of such resources include pictures, sounds, and memory allocated to the game.

Game libraries 404 are built utilizing a common gaming framework and substantially conform to a standard interface defined by a plugin architecture. In some embodiments, dynamic loading may be achieved by loading one or more unique symbols from a library (shared object or ".so") during runtime. In alternative embodiments, dynamic loading may be achieved by creating the game library as a dynamic load library (".DLL"). Each game library 404 provides the following required function interfaces for dynamic loading:

CreateGame—Instantiate a game within the framework.

DestroyGame—Remove an instance of a game running within the framework.

Game manager Interface 412 is an instance of the game manager interface object, which allows the game framework 302 to communicate with gaming subsystem 304. In some embodiments, this object is provided by gaming subsystem 304. Callback handlers may be used as needed by the system.

Figure 5:
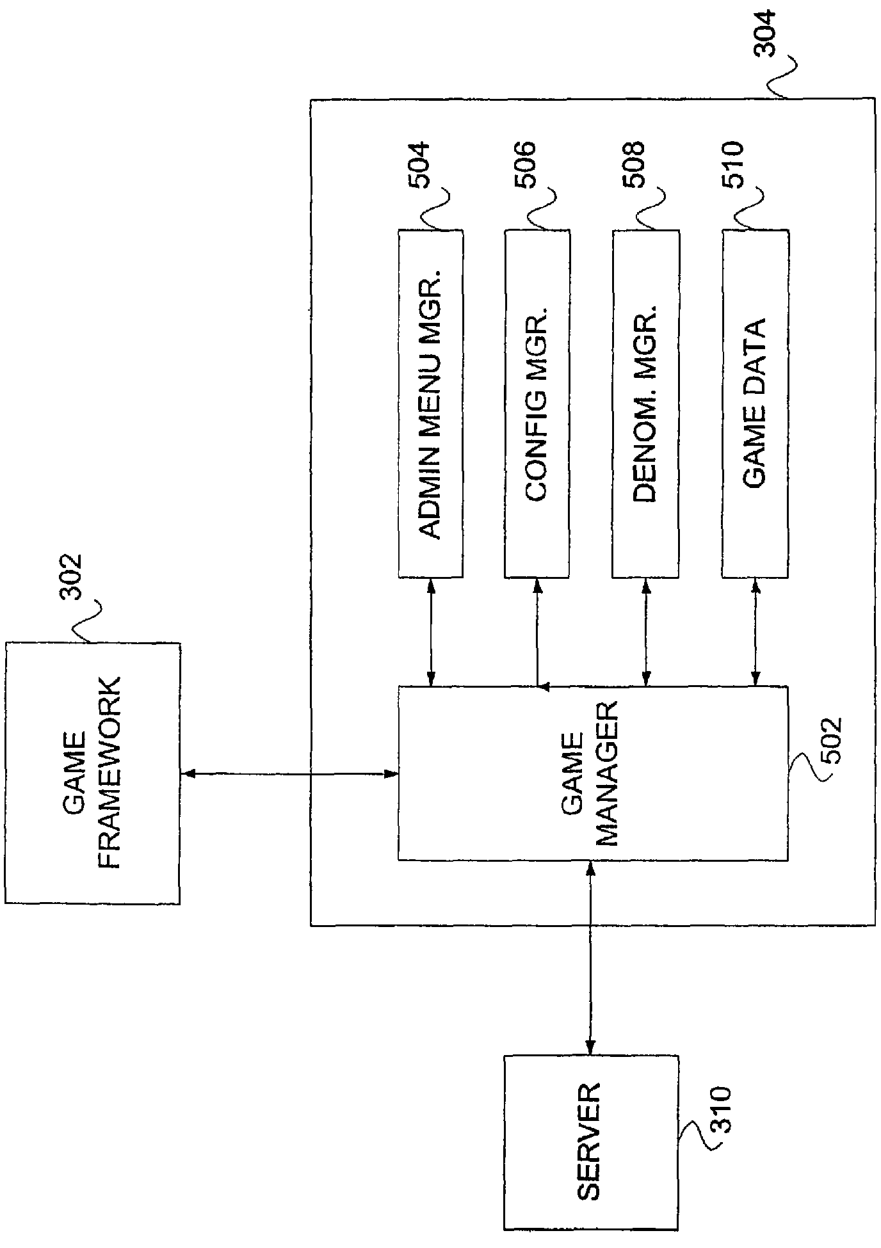
FIG. 5 is a block diagram providing further details of a gaming subsystem according to varying embodiments of the invention.

FIG. 5 is a block diagram providing further details of a gaming subsystem 304 according to varying embodiments of the invention. In some embodiments, gaming subsystem 304 includes game manager 502, admin menu manager 504, configuration manager 506, denomination manager 508 and game data module 510.

Game manager 502 serves as the main interface into gaming subsystem 304. In some embodiments, game manager 502 manages the selection of a pay table, game configuration changes, available denomination changes for a game or gaming machine, and/or denomination changes for a particular game.

Admin menu manager 504 controls the characteristics and layouts of an admin menu to be displayed on the gaming machine. In some embodiments, admin menus are loaded during runtime from a configuration file. The configuration file may be in an XML format. In these embodiments, the admin menu manager 504 utilizes an XML parser to obtain the admin menu. In particular embodiments, the Xerces XML parser is used for parsing the configuration file.

Configuration manager 506 manages the game configuration data. In some embodiments, functionality provided by configuration manager 506 includes the ability to search for configuration data by game type and to search by game identifier.

Denomination manager 508 manages the mapping of denominations to games. For example, the denomination manager may provide for supporting various denominations on a per game basis instead of or in addition to a per machine basis. Additionally, the denomination manager may provide maximum wager limits based on configuration data or based on data received from host 310. In some embodiments, functionality provided by denomination manager 508 includes the ability to determine game type availability for a denomination, searching by game type, and mapping denominations for multiple games on VLT 10.

Game data module 510 manages the runtime data of the available games in the system. In some embodiments the game data module provides support for searching game data by game type.

Figure 6:
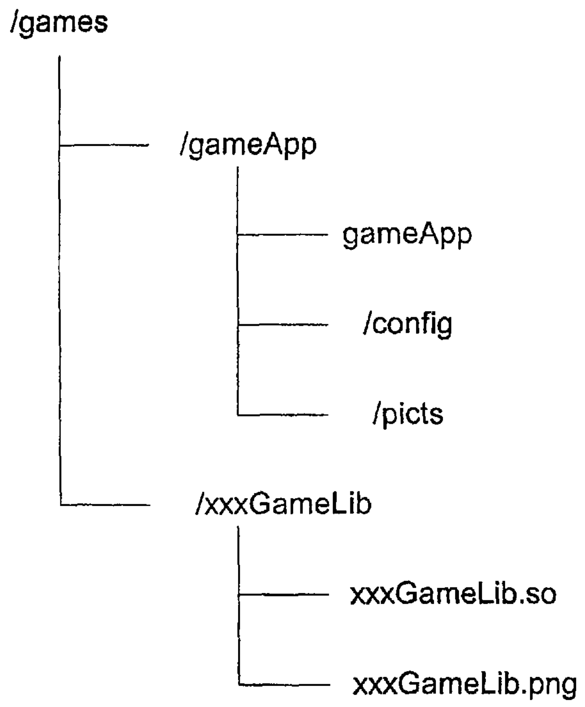
FIG. 6 is an illustration of an exemplary directory hierarchy used in various embodiments of the invention.

FIG. 6 is an exemplary directory hierarchy used in some embodiments of the invention. Those of skill in the art will appreciate that other hierarchies may be used and that the inventive subject matter is not limited to any particular directory hierarchy. In some embodiments, the directory hierarchy includes a gameApp directory and game library directory for each available game.

The gameApp directory contains the main game application and resources utilized by the application. The files and directories under the gameApp directory are typically files that are useful across multiple games. For example, jurisdiction specific files or files used by the main game application are typically found here.

The config directory contains configuration files for the main application. In some embodiments, the configuration files are XML compliant. A configuration file may contain configurations for multiple jurisdictions. In some embodiments, the applicable jurisdiction for the gaming machine is read from a chip on the gaming machine and the appropriate section of the configuration file is then used. An exemplary menu screen configuration file in XML is as follows:

```
<MenuScreen>
    <Alberta>
        <Background>
            <Identifier>background</Identifier>
            <Filename>/games/gameApp/picts/BKGRND.png</Filename>
        </Background>
        <Image>
            <Identifier>mainCreditMeter</Identifier>
            <Filename>/games/gameApp/picts/METER_CREDITS.png</Filename>
            <X>320</X>
            <Y>10</Y>
            <Flags>enabled visible transparent</Flags>
        </Image>
        <Label>
            <Identifier>mainCreditDisplay</Identifier>
            <Parent>mainCreditMeter</Parent>
            <X>151</X>
            <Y>35</Y>
            <Text>0</Text>
            <Font>/games/gameApp/picts/fonts/led_18x25_green.fnt</Font>
            <Align>right bottom</Align>
        </Label>
        <Image>
            <Identifier>mainCashMeter</Identifier>
            <Filename>
                /games/gameApp/picts/METER_CURRENCY.png
            </Filename>
            <X>320</X>
            <Y>80</Y>
            <Flags>enabled visible transparent</Flags>
        </Image>
        <Label>
            <Identifier>mainCashDisplay</Identifier>
            <Parent>mainCashMeter</Parent>
            <X>151</X>
            <Y>35</Y>
            <Text>0</Text>
            <Font>/games/gameApp/picts/fonts/led_18x25_green.fnt</Font>
            <Align>right bottom</Align>
        </Label>
        <Button>
            <Identifier>mainCollectBtn</Identifier>
            <X>100</X>
            <Y>100</Y>
            <Text>Collect</Text>
        </Button>
        <Button>
            <Identifier>mainHelpBtn</Identifier>
            <X>400</X>
            <Y>100</Y>
            <Text>Help</Text>
        </Button>
        <ScrollBox>
            <Identifier>banner</Identifier>
            <X>0</X>
            <Y>200</Y>
            <Width>800</Width>
            <Height>100</Height>
            <BlitInterval>5</BlitInterval>
            <Text>TOUCH GAME PAD BELOW TO CHOOSE YOUR GAME</Text>
            <Font>/sdg/gameApp/picts/fonts/arial-bold-14-white.fnt</Font>
        </ScrollBox>
        <GameButton>
            <Identifier>CanadianPride</Identifier>
            <X>10</X>
            <Y>300</Y>
        </GameButton>
        <GameButton>
            <Identifier>FlushFortune</Identifier>
```

-continued

```
        <X>300</X>
        <Y>300</Y>
      </GameButton>
  </Alberta>
</MenuScreen>
```

It should be noted that the exemplary configuration only contains one jurisdiction (Alberta). Those of skill in the art will understand how the configuration file may be adapted to represent multiple jurisdictions.

The picts directory contains graphic files to be used by the main application. For example, jurisdictional specific or mandated picture files may be placed in the picts directory.

Game library directories may be named as "xxxGameLib" where "xxx" identifies a particular game. In general, game libraries adhere to a plugin architecture interface in order to be loadable within the system. As noted above, the libraries may be shared object library files (".so" files) or they may be dynamic link library files (".dll" files) depending on the underlying operating system on the gaming machine. In addition, sound files that a used by a game may be placed in the xxxGameLib directory. For example, the file xxxGameLib-.png may contain sounds used at various points in the game.

Figure 7:
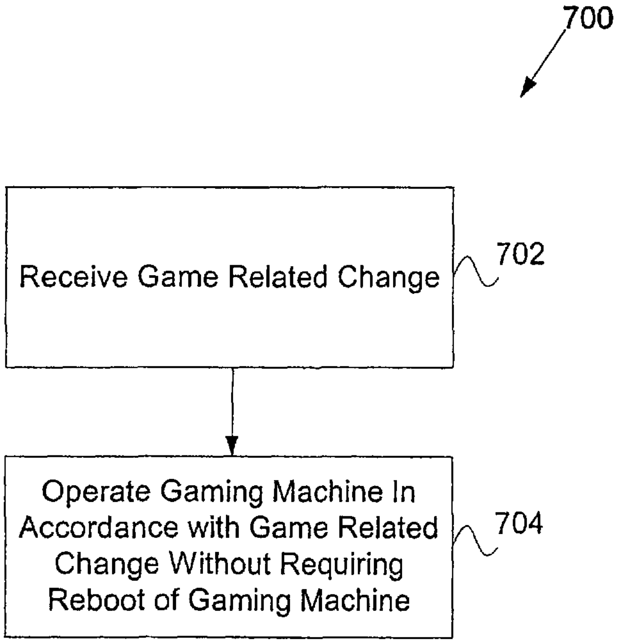
FIG. 7 is a flowchart illustrating a method for providing game library management according to various embodiments of the invention.

FIG. 7 is a flowchart illustrating a method 700 for providing game library management according to various embodiments of the invention. The method to be performed by the operating environment constitutes computer programs made up of computer-executable instructions. Describing the method by reference to a flowchart enables one skilled in the art to develop such programs including such instructions to carry out the method on suitable processors for gaming machines (the processor or processors of the computer executing the instructions from computer-readable media). The methods illustrated in FIG. 7 are inclusive of acts that may be taken by an operating environment executing an exemplary embodiment of the invention.

Method 700 begins by receiving over a network interface a game related change for at least one game of a plurality of wagering games (block 702). The game related change may come in a variety of forms. One example of a game related change is adding, updating or removing a wagering game in a set of wagering games for the gaming machine. The addition, update, or deletion may comprise adding, removing, or deleting a dynamically loadable library such as a shared object library or a dynamic link library. Additionally, the game related change may comprise adding, updating, or deleting a configuration file for the gaming machine. Further, the game related change may comprise add, updating, or deleting picture or sound files on the gaming machine. Any of the above changes may be changes that apply to a specific wagering game, or the changes may apply to a jurisdictional related aspect of the gaming machine.

Then, the gaming machine is operated in accordance with the game related change without requiring a reboot of the gaming machine (block 704). In some embodiments, relevant components are notified of the change, which may prompt to component to read an new or updated configuration file, or to load a new or updated dynamically loadable game library. For example, if a new main menu is included in a new configuration file, the menu screen manager is notified of the change. The menu screen manager may then read the new or updated configuration file and display the new menu. Similarly, if a new or updated game library is placed on the gaming machine, the game library manager may be notified so that it loads the appropriate library the next time the game is selected.

It is important to note that the above-described changes may be accomplished without requiring a reboot of the gaming machine. In other words, relevant modules may read new or updated configuration files and game libraries at the next available opportunity, they need not wait until the gaming machine is rebooted.

CONCLUSION

Systems and methods for managing one or more games on a gaming machine have been disclosed. The systems and methods described provide advantages over previous systems. For example, the game framework and game libraries of various embodiments provide the opportunity add, update, and remove games and game configurations on a gaming machine without requiring physical access to the gaming machine or shutting the gaming machine down.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

What is claimed is:

1. A computer-implemented method for managing multiple games on a gaming machine, the method comprising:

receiving, at the gaming machine via a network interface, a game-related change for the gaming machine, the game-related change being jurisdiction-specific and adding a configuration file that includes configuration data for a plurality of gaming jurisdictions, the game-related change being selected from a group consisting of adding a new wagering game to a plurality of games on the gaming machine, removing a wagering game from the plurality of games on the gaming machine, and updating a wagering game of the plurality of games on the gaming machine;

storing, in one or more memory devices, the configuration file on the gaming machine;

reading, via at least one of one or more processors of the gaming machine, a current gaming jurisdiction from a chip of the gaming machine;

selecting, via at least one of the one or more processors, a section of the stored configuration data according to the current gaming jurisdiction; and applying the jurisdiction-specific game-related change and operating the gaming machine in accordance with the jurisdiction-specific game-related change, via at least one of the one or more processors and without requiring a reboot of the gaming machine, by defining a new menu screen for the gaming machine according to the selected section of the configuration data.

2. The computer-implemented method of claim 1, wherein operating the gaming machine includes dynamically loading a game library for at least one of a plurality of games on the gaming machine.

3. The computer-implemented method of claim 2, wherein the game library is a shared object library.

4. The computer-implemented method of claim 2, wherein the game library is a dynamic load library.

5. A wagering game system comprising a non-transitory computer-readable medium having computer executable instructions that, when executed by at least one of one or more processors, cause a gaming machine of the wagering game system to:

receive, at the gaming machine via a network interface, a game-related change for the gaming machine, the game-related change being jurisdiction-specific and adding a configuration file that includes configuration data for a plurality of gaming jurisdictions, the game-related change being selected from a group consisting of adding a new wagering game to a plurality of games on the gaming machine, removing a wagering game from the plurality of games on the gaming machine, and updating a wagering game of the plurality of games on the gaming machine;

store, in one or more memory devices, the configuration file on the gaming machine;

read a current gaming jurisdiction from a chip of the gaming machine;

select a section of the stored configuration data according to the current gaming jurisdiction;

apply the jurisdiction-specific game-related change on the gaming machine and operate the gaming machine in accordance with the jurisdiction-specific game-related change, without requiring a reboot of the gaming machine, by defining a new menu screen for the gaming machine according to the selected section of the configuration data.

6. The wagering game system of claim 5, wherein operating the gaming machine includes dynamically loading a game library for at least one of a plurality of games on the gaming machine.

7. The wagering game system of claim 6, wherein the game library is a shared object library.

8. The wagering game system of claim 6, wherein the game library is a dynamic load library.

9. A gaming machine operable to conduct one or more wagering games, the gaming machine configured to implement jurisdiction-specific changes during continuous operation, the gaming machine comprising:

a network interface;

one or more processors; and one or memory devices storing instructions that, when executed by at least one of the one or more processors, cause the currently operating gaming machine to:

receive, via the network interface, a jurisdiction-specific game-related change to the gaming machine, the jurisdiction-specific game-related change being selected from a group consisting of adding a new wagering game to a plurality of games on the gaming machine, removing a wagering game from the plurality of games on the gaming machine, and updating a wagering game of the plurality of games on the gaming machine;

read, from at least one of the one or more memory devices, a gaming jurisdiction that currently regulates the gaming machine;

select, via at least one of the one or more processors and without manual input, configuration data corresponding to the current gaming jurisdiction from one or more files of configuration data stored on at least one of one or more memory devices;

dynamically apply, via at least one of the one or more processors while continuing to operate, the jurisdiction-specific game-related change to the gaming machine according to the selected configuration data, the applying including defining a new menu screen for display by the gaming machine; and implement, while continuing to operate, the jurisdiction-specific game-related change including displaying the new menu screen on one or more display devices of the gaming machine.

10. The gaming machine of claim 9, further comprising a game library manager operable to manage a dynamically loadable library of game objects utilized in at least one of the one or more games, and wherein implementing the jurisdiction-specific game-related change includes loading game objects from a dynamically loadable library of game objects for at least one of the one or more wagering games.

11. The gaming machine of claim 9, further comprising a window manager that controls display of a main window of at least one of the one or more wagering games, and wherein the jurisdiction-specific game-related change causes a change to the main window of at least one of the one or more wagering games.

12. The gaming machine of claim 9, further comprising a menu screen manager that defines the new menu screen in accordance with the jurisdiction-specific game-related change.

13. The gaming machine of claim 9, wherein the selected configuration data conforms to a version of the XML specification.

14. The gaming machine of claim 9, further comprising a denomination manager operable to manage one or more denominations available for a game on the gaming machine, and wherein the jurisdiction-specific game-related change includes a change to the available denominations.

15. The gaming machine of claim 9, further comprising an administrative menu manager operable to provide an administrative menu on the gaming machine in accordance with a configuration file, and wherein the jurisdiction-specific game-related change requires a corresponding change to the administrative menu.

16. The gaming machine of claim 9, further comprising a configuration manager operable to manage configuration data for the gaming machine.

* * * * *